US006829580B1

(12) United States Patent
Jones

(10) Patent No.: US 6,829,580 B1
(45) Date of Patent: Dec. 7, 2004

(54) LINGUISTIC CONVERTER

(75) Inventor: Rhys James Jones, Swansea (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/646,933

(22) PCT Filed: Apr. 22, 1999

(86) PCT No.: PCT/GB99/01255

§ 371 (c)(1),
(2), (4) Date: Sep. 25, 2000

(87) PCT Pub. No.: WO99/56221

PCT Pub. Date: Nov. 4, 1999

(30) Foreign Application Priority Data

Apr. 24, 1998 (EP) .............................. 98303208

(51) Int. Cl.$^7$ .............................. G10L 15/18
(52) U.S. Cl. .............................. 704/257; 704/9; 704/10; 704/251
(58) Field of Search .............................. 704/257, 9, 10, 704/240, 251, 260, 277

(56) References Cited

U.S. PATENT DOCUMENTS

| | | | | |
|---|---|---|---|---|
| 5,781,884 A | * | 7/1998 | Pereira et al. | 704/260 |
| 5,794,177 A | * | 8/1998 | Carus et al. | 704/9 |
| 6,094,633 A | * | 7/2000 | Gaved et al. | 704/260 |
| 6,098,035 A | * | 8/2000 | Yamamoto et al. | 704/9 |

OTHER PUBLICATIONS

"A Text Analyzer for Korean Text–to–Speech Systems"; Sangho lee; Yung–Hwan Oh; Spoken Language, 1996. ICSLP 96. Proceedings., Fourth International Conference on, Vol.: 3, Oct. 3–6, 1996; pp.: 1692–1695 vol. 3.*
Abe et al, "A Kana–Kanji Translation System for Non–Segmented Input Sentences Based on Syntactic and Semantic Analysis", Zeitschrift Fuer Werkstofftechnik—Journal of Materials Technology, Materials Technology and Testing, Aug. 25, 1986, pp. 280–285, XP000612328.
Do et al, A Proposal for Vietnamese Character Encoding Standards in a Unified Text Processing Framework, Computer Standards and Interfaces, vol. 14, No. 1, Jan. 1, 1992, pp. 3–12, XP000247148.
IBM Technical Disclosure Bulletin, "Intelligent Computer Keyboard for Entering Texts of Sinhalese and Other Similar Languages", vol. 35, No. 6, Nov. 1, 1992, pp. 24–27, XP000314045.
Derouault et al, "Natural Languages Modeling for Phoneme–to–Text Transcription", IEEE Transactions on Pattern Analysis and Machine Intelligence, Nov. 1986, vol. PAMI–8, No. 6, pp. 742–749, XP002071655.
Nobuyasu Itoh, "Japanese Languages Model Based on Bigrams and its Application to On–Line Character Recognition", Pattern Recognition, vol. 28, No. 2, Feb. 1, 1995, pp. 135–140, XP000491544.

* cited by examiner

Primary Examiner—W. R. Young
Assistant Examiner—James S. Wozniak
(74) Attorney, Agent, or Firm—Nixon & Vanderhye P.C.

(57) ABSTRACT

A linguistic analyzer converts words from graphemes to phonemes using a relatively small phonemic dictionary. Words which are not in the dictionary are analyzed by performing one or more transformations on the required word in order to create a word which is in the dictionary. Analogous transformations are performed on a retrieved phoneme sequence in order to provide a phoneme sequence which corresponds to the original word.

9 Claims, 4 Drawing Sheets

LINGUISTIC CONVERTER

BACKGROUND OF THE INVENTION

1. Field of the Invention

This invention relates to a converter for generating a sequence of linguistic elements from a signal representing text. In particular this invention relates to a converter for generating a sequence of phonemes from a textual signal. Such a converter is commonly referred to as a grapheme to phoneme converter, a grapheme being a sub sequence of one or more letters, and a phoneme being a particular type of linguistic element which represents the pronunciation of part of a word. A grapheme to phoneme converter may be used in speech synthesis during text analysis, prior to synthesis of speech from the sequence of phonemes. It may also be used in speech recognition in order to generate a sequence of linguistic elements required to create a speech recognition template. Another use for such a converter could be in a process to linguistically analyse text (for example, sentences) to determine the linguistic properties of the text for example, in terms of the number of phonemes, biphones or triphones.

2. Related Art

One technique for converting a sequence of graphemes to a sequence of phonemes is to use a set of letter-to-sound rules. However, unless a language is phonetic such rules will often produce incorrect phoneme sequences (or pronunciations) for some words. An alternative is to use a large lexicon which provides a phonemic transcription for as many as possible words in a language.

For languages such as Celtic languages (for example, Welsh) and other languages which exhibit the phenomenon known as mutation, the initial letter of a word changes depending on the context of the word. If every possible mutation of a word is included in a lexicon the result is an enormous dictionary which requires a large amount of memory, and long search times.

BRIEF SUMMARY OF THE INVENTION

In this invention a linguistic analyser is provided which uses a phonemic look-up table or dictionary with a smaller number of dictionary entries than would be required if a phonemic transcription was provided for each possible word in a language, thus reducing memory and search time required by the analyser.

According to the present invention there is provided an apparatus for receiving an input signal representing a word, each word comprising a sequence of one or more graphemes, and for providing a sequence of one or more symbols, each symbol representing a phonetic element of said word said apparatus comprising a first store containing a plurality of representations of words and corresponding symbol sequences;

a second store containing a plurality of duples comprising a substitutable grapheme and a corresponding substitute grapheme;

a third store containing a plurality of duples comprising a substitutable grapheme and a corresponding symbol; and a processor arranged to
      receive said input signal;
      provide a first signal corresponding to a grapheme in the word and a second signal corresponding to any graphemes other than said grapheme;
      access the second store using the first signal to retrieve a corresponding substitute grapheme;
      access the third store using the first signal to retrieve a corresponding symbol;
      provide a modified signal comprising a signal corresponding to said substitute grapheme and said second signal;
      access the first store using the modified signal to retrieve a corresponding sequence of symbols;
      provide a modified sequence of symbols comprising the symbol retrieved from the third store and symbols of the retrieved sequence, which symbols correspond to the second signal.

In a preferred embodiment the first signal corresponds to the first grapheme in the word.

This invention also provides a method for analysing a word, each word comprising a sequence of one or more graphemes, and for providing a sequence of one or more symbols, each symbol representing a phonetic element of said word, the method comprising steps of a) providing a first signal corresponding to a grapheme in the word and a second signal corresponding to any graphemes other than said grapheme;

b) using the first signal to determine a corresponding substitute grapheme;

c) using the first signal to determine a corresponding symbol;

d) providing a modified signal comprising a signal corresponding to said substitute grapheme and said second signal;

e) using the modified signal to determine a corresponding sequence of symbols;

f) providing a modified sequence of symbols comprising the symbol determined at step c) and symbols of the retrieved sequence, which symbols correspond to the second signal.

In a preferred embodiment the first signal corresponds to the first grapheme in the word.

In an improved version, in the event that no sequence of symbols corresponding to the modified signal is determined at step e) the method further comprises steps of g) providing a suffix signal corresponding to a subsequence of graphemes at the end of the word and a whole stem signal corresponding to the subsequence of graphemes other than those corresponding to the suffix signal;

h) using the whole stem signal to determine a corresponding sequence of symbols;

i) in the event that a sequence of symbols corresponding to the stem signal is not determined at step h), providing an ending signal corresponding to a sequence of graphemes with which a word may end and using a signal comprising the whole stem signal and the ending signal to determine a corresponding sequence of symbols;

i) using the suffix signal to determine a corresponding sequence of symbols; and j) providing a sequence of symbols comprising the symbol sequence corresponding to the stem signal and the symbol sequence corresponding to the suffix signal.

And another improvement gives a method in which in which in the event that no sequence of symbols corresponding to the stem signal is determined at step h) the method further comprises steps of k) providing a first stem signal corresponding to a grapheme in the sequence of graphemes corresponding to the stem signal and a second stem signal corresponding to any graphemes other than said grapheme;

l) using the first stem signal to determine a corresponding substitute grapheme;

m) using the first stem signal to determine a corresponding symbol;

n) providing a modified signal comprising a signal corresponding to said substitute grapheme and said second stem signal;

o) using the modified signal to determine a corresponding sequence of symbols;

p) providing a modified sequence of symbols comprising the symbol determined at step m), symbols of the retrieved sequence, which symbols correspond to the second stem signal and symbols corresponding to the suffix symbol.

This invention also provides a speech synthesiser incorporating a linguistic analyser as described above and a speech recogniser incorporating a linguistic analyser as described above.

BRIEF DESCRIPTION OF THE DRAWINGS

An embodiment of the invention will now be described with reference to the accompanying drawings in which.

DETAILED DESCRIPTION OF EXEMPLARY EMBODIMENTS

The embodiment of the invention described below is used to analyse Welsh sentences in order to design a set of phonetically rich sentences and phonetically rich words for use in collecting a 2000 speaker speech recognition database.

Figure 1:
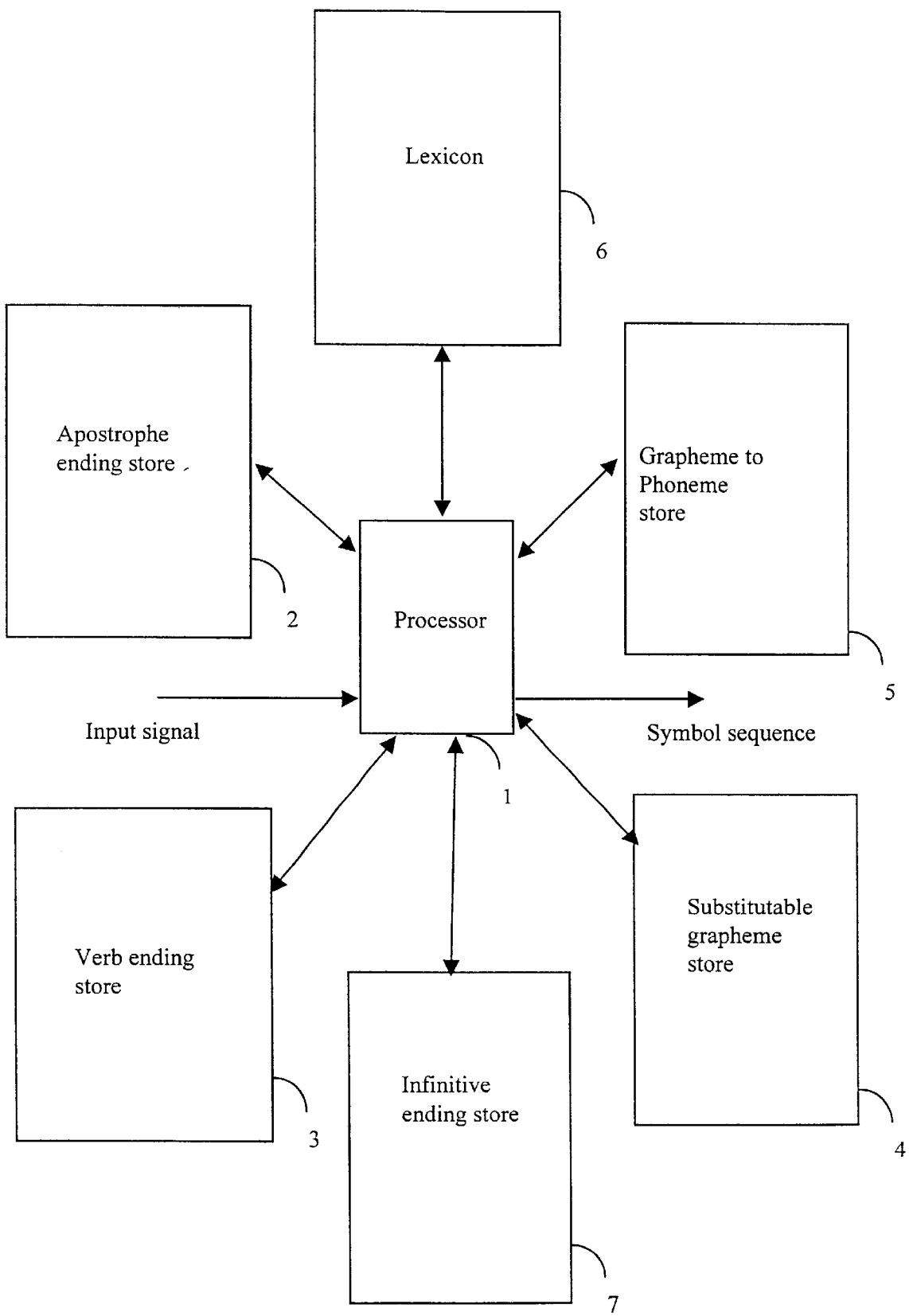
FIG. 1 shows a block diagram of an apparatus according to an embodiment of the present invention.

Referring to FIG. 1, a processor 1 is connected to receive an input signal representing a word or a sequence of words and to provide as an output a sequence of symbols, or phonemes each of which represents a linguistic element of an input word. The steps carried out in the processor will be described in detail later with reference to FIGS. 2 to 4. The processor has access to a number of stores 2, 3, 4, 5, and 7 and a lexicon 6. The processor may be implemented by a standard microprocessor chip, and the stores may be implemented by a standard random access memory chip. It will be appreciated that the stores 2, 3, 4, 5, and 7, and the lexicon 6 may be implemented using different chips, or they may share one or more chips.

In common with other Celtic minority languages, Welsh exhibits mutation. It occurs, in Welsh, for nine liquids and plosives, present as initial phoneme-like units of words. These initial phonemes can change in certain well-defined contexts. We can take the word 'cadair' (chair, /k a d aI r/) as an example. The table below shows the three possible mutations of the word in three different contexts.

| Mutation context | English equivalent | Mutation type exhibited |
|---|---|---|
| Dy gadair | Your chair (familiar form) | Soft |
| Fy nghadair | My chair | Nasal |
| Ei chadair | Her chair | Aspirate |

A detailed discussion of mutations in Welsh is found in "Teach yourself Welsh", by T. J. Rhys Jones, published by Hodder and Stoughton (1992). It is sufficient to realise that mutated forms of words, though a grammatical feature of spoken and written Welsh, do not appear in the lexicon 6. Hence, support for mutation is a prerequisite for the linguistic analyser of this embodiment of the invention.

However, the principles used in the linguistic analyser to support the phenomena of mutation can equally well be applied to any language in which it is possible to deduce the pronunciation of a word from the pronunciation of a similarly spelled word. For example, in English it is possible to deduce the pronunciation of the (fictitious) word "dak" if you know the pronunciation of the word "dad".

Subject-dependent verb endings also occur in Welsh, in common with most other European languages. In this embodiment only infinitive forms of verbs appear in the lexicon 6, therefore this embodiment of the invention also handles verb endings.

The linguistic analyser of this embodiment of the invention can also handle words which have apostrophes in the textual representation, including apostrophes following verb endings.

In the following description, transformation of a word in certain contexts is referred to as 'mutation' even when such a transformation of a word may not strictly be due to the linguistic phenomenon known as mutation. In order to deal with mutation, the invention reverses any contextual transformation of a word prior to attempting to look up the word in the lexicon. In the reversing mutations using this invention a substitutable (ie a mutated) grapheme is replaced by a substitute (ie an unmutated) grapheme.

Referring again to FIG. 1, the lexicon 6 contains a list of radical (or unmutated) forms of words and infinitive forms of words, each with a corresponding phonemic sequence. The phonemes in this embodiment of the invention are represented using a Speech Assessment Method Phonetic Alphabet (SAMPA) compliant convention. For a description of the SAMPA convention see "Computer-coded phonetic notation of individual languages in the European Community", by John Wells Journal of the IPA, Vol 19, pp 32 (1989).

The grapheme to phoneme store 5 contains a list of substitutable graphemes (ie graphemes which may have resulted from a mutation), together with a corresponding phoneme for each substitutable grapheme. The substitutable grapheme store 4 contains a list of the same graphemes as the grapheme to phoneme store 5 together with a corresponding substitute grapheme (from which any mutation may have occurred) for each substitutable grapheme. It will be appreciated that the stores 4 and 5 could be implemented as a list of triples, each triple containing a mutated grapheme, a corresponding phoneme and a radical (or unmutated) grapheme. In the embodiment described here the substitutable grapheme store 4 contains the following entries:

| substitutable grapheme | substitute grapheme |
|---|---|
| a | g |
| b | p |
| ch | c |
| d | t |
| dd | d |
| e | g |
| f | b/m |
| g | c |

-continued

| substitutable grapheme | substitute grapheme |
|---|---|
| ng | g |
| ngh | c |
| h | |
| l | g/ll |
| m | b |
| mh | p |
| n | d |
| nh | t |
| o | g |
| ph | p |
| r | rh/g |
| th | t |
| w | g |
| y | g |

Some of the substitutable graphemes have more than one possibility for substitution, for example "r" may be substituted by "rh" or "g". Also the grapheme "h" has no entry in the substituted grapheme column because it may be substituted by nothing (ie removed).

The grapheme to phoneme store 5 contains the following entries:

| Substitutable grapheme | Phoneme equivalent |
|---|---|
| a | a |
| b | b |
| ch | x |
| d | d |
| dd | D |
| e | E |
| f | v |
| g | g |
| ng | N |
| ngh | hN |
| h | h |
| l | l |
| m | m |
| mh | hm |
| n | n |
| nh | hn |
| o | Q |
| ph | f |
| r | r |
| th | T |
| w | U |
| y | @ |

The verb ending store 3 contains a list of graphemes which correspond to the most common verb endings in Welsh. Not all possible verb endings are represented in the table. Each verb ending in the list has a corresponding phonemic transcription. In the embodiment described here the verb ending store contains the following entries:

| Verb ending | Phonemic Transcription |
|---|---|
| ach | ax |
| af | av |
| wn | Un |
| wch | Ux |
| et | Et |
| en | En |
| ed | Ed |
| ech | Ex |
| t | t |
| a | a |

-continued

| Verb ending | Phonemic Transcription |
|---|---|
| ais | ais |
| est | est |
| o | Q |
| odd | QD |
| on | Qn |
| och | Qx |
| ai | ai |
| wyd | uId |

The apostrophe ending store 2 contains a list of letter sequences or graphemes which might possibly follow an apostrophe in a word. Again, not all possible apostrophe endings are represented in the list. Each apostrophe ending in the list has a corresponding phonemic transcription. In the embodiment described here the apostrophe ending store contains the following entries:

| apostrophe ending | phonemic transcription |
|---|---|
| n | n |
| ch | x |
| r | r |
| u | l |
| i | I |
| t | t |
| un | ln |

The infinitive ending store 7 contains possible ending for infinitive verbs, each ending in the list having a corresponding phonemic transcription. In this embodiment of the invention the infinitive ending store contains the following entries:

| infinitive ending | phonemic transcription |
|---|---|
| u | l |
| o | Q |
| a | a |
| e | E |
| i | I |
| w | U |
| y | @ |

Referring again to FIG. 1 additionally to FIG. 2, a brief description of the linguistic analyser will now be given. A given word is received by the processor 1 and the processor 1 is arranged to perform the following steps.

At step 10 the lexicon 6 is searched for the word in its given form. If the given word is found, the corresponding phoneme sequence is provided as an output.

If the given word is not found, then any apostrophe ending is removed at step 12 and the lexicon searched for the resulting word. If the de-apostrophed word is found then the retrieved phoneme sequence is modified at step 15.

If the de-apostrophed word is still not found, the de-apostrophed word is converted into one of the possible unmutated (or radical) forms, if possible, at step 11, and the lexicon is searched for each unmutated form in turn until one of the forms is found in the lexicon. If the converted word is found, the corresponding phoneme sequence is modified at step 13, according to the determined mutation, to relate to the given word. The conversion into unmutated form at step 11 is described later in more detail with reference to FIG. 3.

If the resulting unmutated word is not found, or conversion into unmutated form is not possible, then the word may be a verb. The de-apostrophed word is converted into an infinitive form, if possible, at step 14 and the lexicon is searched for each possible infinitive form in turn. If an infinitive is not found in the lexicon, then the infinitive form is converted into an unmutated form and the lexicon is searched for this unmutated form of infinitive verb. If an infinitive form of the word is found in the lexicon then the retrieved phoneme sequence is modified to reflect any verb endings, and mutation at step 16.

If conversion into infinitive form is not possible then no overall conversion from input text to a sequence of phonemes is possible. Similarly if an unmutated or mutated infinitive form is not found in the lexicon then no overall conversion is possible.

The procedure described above is found to be very effective in correctly identifying and transcribing words, even those which have been both mutated and have a verb ending. It finds approximately 95% of the words in a typical piece of text, and of those 97% are correctly transcribed. Most of the errors and missing words are due to irregular verb endings which are not in the verb ending store 3.

To explain step 12 in more detail, if the word contains an apostrophe then the grapheme following the apostrophe is checked against the endings in the apostrophe ending store 2. If there is a match then the matched ending and the apostrophe are removed and the lexicon is searched for the resulting word. If the resulting word is found, then the retrieved transcription is modified at step 15. The modification is carried out as follows, the phonemic transcription corresponding to the removed apostrophe ending is retrieved from the apostrophe ending store 2 and appended to the phonemic transcription retrieved from the lexicon 6 at step 12. The grapheme to phoneme conversion is then complete. If there is no apostrophe ending, or the de-apostrophed word is not found in the lexicon then the de-apostrophed word is processed further in steps 11,13,14 and 16.

A contextual transformation of a word may take one of three forms. As mentioned previously, all contextual transformations are referred to in this document as mutations. The three possibilities are that a grapheme may be removed from a word, a grapheme may be added to a word, or a grapheme in a word may be replaced by another grapheme. In Welsh, all mutations occur at the beginning of a word. The grapheme "h" may be added to the beginning of a word in certain circumstances although strictly speaking the addition of the grapheme "h" is not a mutation, it may be dealt with in a similar manner to contextual transformations due to mutations. The grapheme 'h' is added to the beginning of a word when the word is preceded by a vowel and when the word refers to a feminine or a plural object. In the embodiment described here reversal of this transformation is dealt with by allowing the grapheme 'h' to be replaced by nothing as defined in the substitutable grapheme store 4. It will be appreciated that grapheme addition during mutation could equally well be dealt with using a separate store for such graphemes.

The grapheme "g" is removed from the beginning of a word when there is a soft mutation of the grapheme "g". In Welsh the grapheme 'g' is only removed if the following grapheme is one of the vowels or the graphemes "l" or "r". In this embodiment of the invention reversal of this mutation is dealt with as a special case by the processor. Again, grapheme removal could equally well be dealt with by use of a separate store which contains a list of removable graphemes together with the graphemes which may be exposed by such removal.

All other mutations in Welsh are in the form of one grapheme replacing another.

Figure 3:
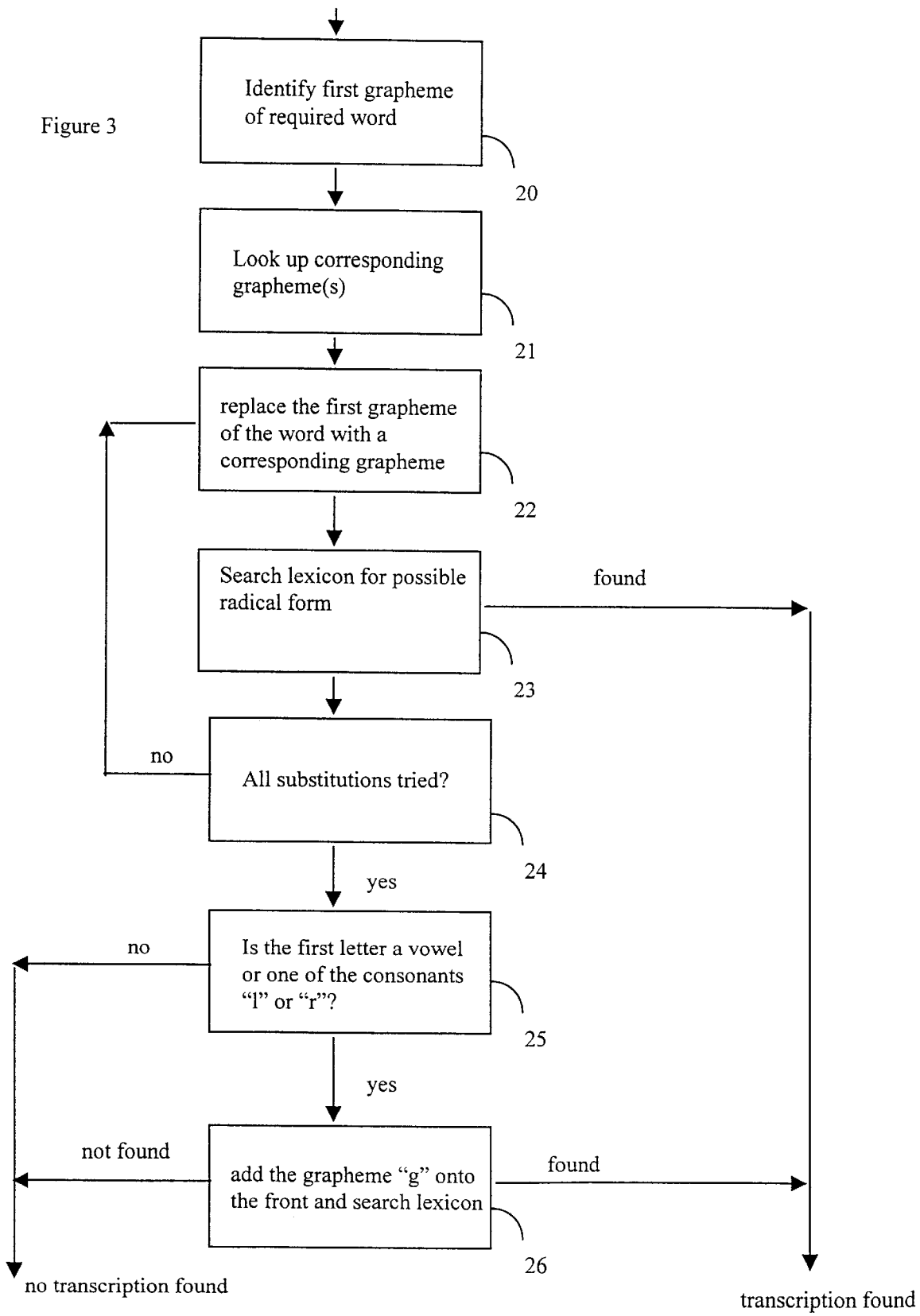
FIG. 3 is a flow diagram of the steps taken to convert a word from a mutated form to a radical form.

Referring now to FIG. 3 and additionally to FIG. 1 the conversion of a word into unmutated form at step 11 will now be described in more detail.

First, at step 20 the first grapheme of a word is identified, and at step 21 a corresponding grapheme if any is identified from the mutatable grapheme store 4. There may be more than one corresponding grapheme in which case one of the possibilities is identified to try first. Another possibility is that the substitute grapheme is null as in the case of the grapheme "h" in this embodiment of the invention. The first grapheme of the word is replaced by the substitute grapheme at step 22 and the lexicon is searched 23 for the modified word. If no match is found, then steps 22 and 23 are repeated until all possibilities have been tried. Once all substitutions have been tried unsuccessfully (and effectively deletions as this is equivalent to replacing by a null grapheme) insertion of graphemes are tried. In this embodiment of the invention the only grapheme which may be inserted (as it is the only grapheme removed by mutation in Welsh) is the grapheme "g" prior to a vowel or the consonants "l" or "r". Hence, at step 25 the first grapheme is checked to determine whether it is a vowel or the consonants "l" or "r". If it is not then no phoneme sequence may be generated. If it is then the grapheme "g" is prepended onto the word, and the modified word is searched for in the lexicon at step 26.

Figure 2:
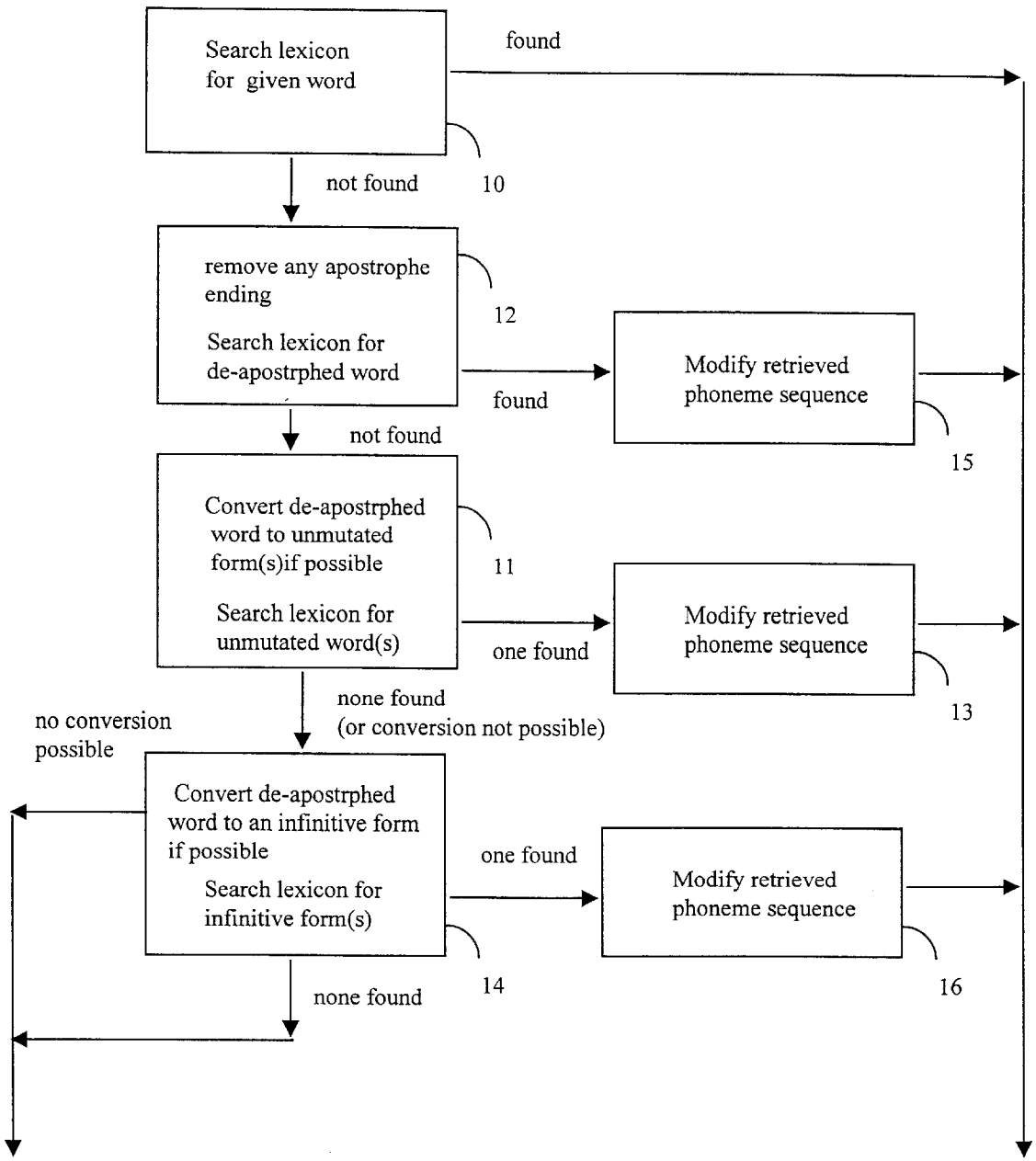
FIG. 2 is a flow diagram showing the steps used to produce a sequence of symbols corresponding to a word in an embodiment of the present invention.

The modification of any retrieved phoneme sequence at step 13 of FIG. 2 requires knowledge as to the type of transformation carried out at step 11. In general all modification of phoneme sequences (at steps 15, 13, and 16 of FIG. 2) require information as to the transformations carried out on the received word. Hence a record is kept as to the transformations which have been carried out during steps 12, 11 and 14.

If a grapheme was deleted, then a corresponding phoneme must be added to the retrieved transcription. In principle, a corresponding phoneme could be determined using a grapheme to phoneme store such as that shown at 5. However, in this embodiment, only the grapheme "h" may be deleted from the front of the word by one of the possible transformations, therefore the corresponding phoneme (which happens to be "h") is prepended to the retrieved phoneme sequence. If a grapheme was added in order to convert the word to unmutated form then the corresponding phoneme must be deleted from the retrieved phoneme sequence. Again, a corresponding phoneme could be determined using a grapheme to phoneme store such as that shown at 5. However, in this embodiment, only the grapheme "g" may be prepended to the beginning of the word in Welsh mutation, therefore the corresponding phoneme (which happens to be "g") is deleted from the retrieved phoneme sequence. Otherwise the transformation must have been a substitution, and the substituted phoneme, which in this embodiment is always the first phoneme of the retrieved transcription, but which in principle could be any one of the phonemes in the retrieved transcription, is deleted and replaced by the substitute phoneme which is retrieved from the grapheme to phoneme store 5.

If an apostrophe ending was removed at step 12 then the phonemic transcription corresponding to the removed apostrophe ending is retrieved from the apostrophe ending store 2 and appended to the modified phonemic transcription. The grapheme to phoneme conversion is then complete.

Figure 4:
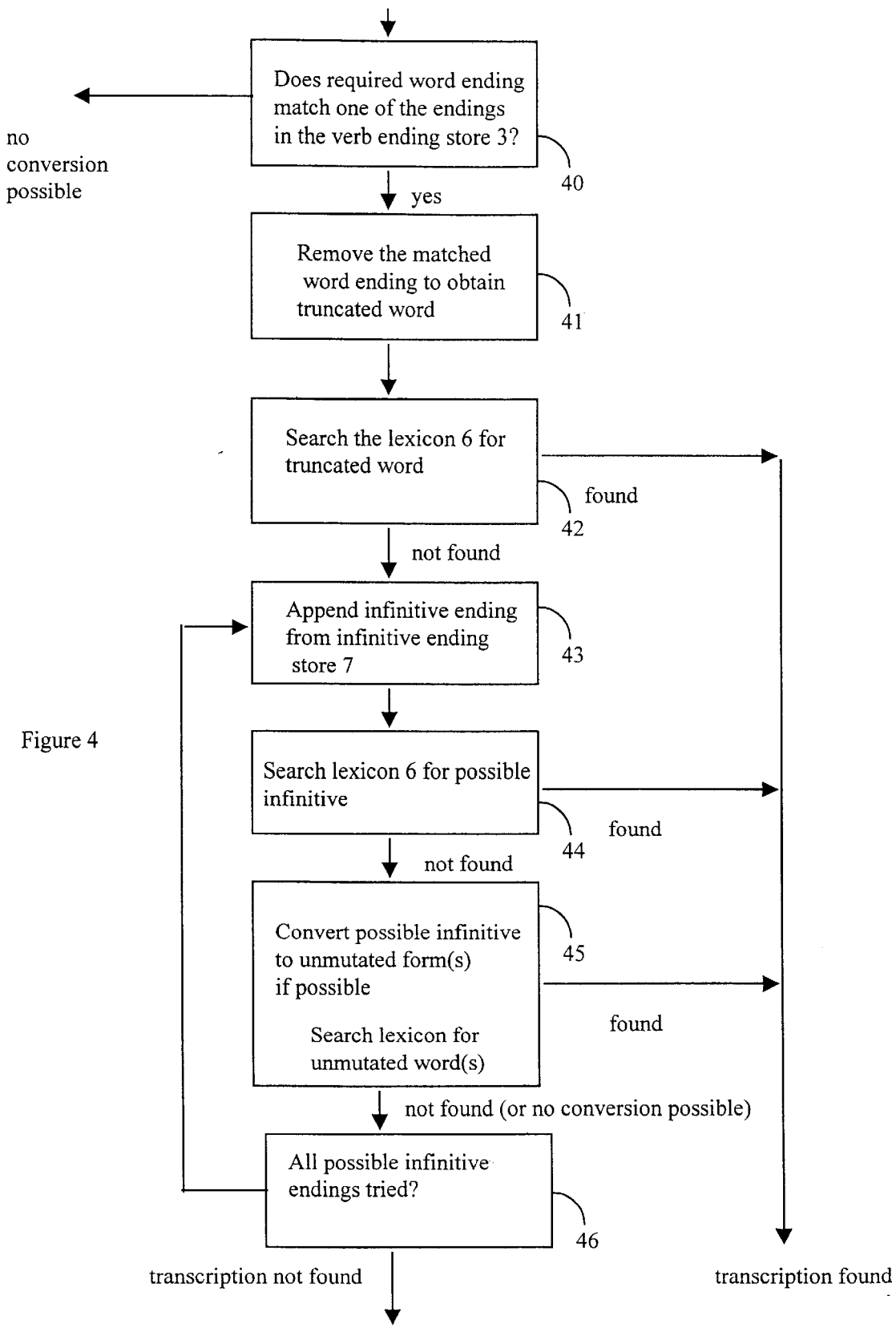
FIG. 4 is a flow diagram of the steps used to deal with verb endings.

The conversion to infinitive form at step 14 of FIG. 2, including possibly converting to unmutated infinitive form is now described in more detail with reference to FIG. 4. At step 40 the received word, which resulted from the removal of any apostrophe from the given word is checked against the word endings from the word ending store 3. If the required word does not end in any of the verb endings in the store then conversion to infinitive form is not possible. Otherwise the verb ending which matches that of the required word is removed at step 41 and the lexicon is searched for the resulting truncated word at step 42. Such a truncated word may possibly be an infinitive form of the given word, or it may be a noun from which a verb has been derived. For example, removing the ending from 'gwasgodd', which translates as 'he pressed', gives 'gwasg', which translates as 'a press'. If the truncated word is not found at step 42 then an infinitive ending, which is retrieved from the infinitive ending store 7, is appended 43 to the word to create a possible infinitive, and the lexicon 6 is searched at step 44 for the possible infinitive. If the possible infinitive is not found at step 44 then at 45 the possible infinitive is converted to unmutated form, if possible, and the lexicon is searched for possible unmutated words. The conversion to unmutated form, and lexicon search at step 45 is analogous to the conversion and search at step 11 of FIG. 1, which is described in detail with reference to FIG. 3. If no conversion is possible, or an unmutated form is not found in the lexicon then at step 46 a check is made as to whether all the infinitive endings have been tried. If not, another infinitive ending is retrieved from the infinitive ending store 7 at step 43 and steps 44 and 45 are repeated. Once all the infinitive endings have been unsuccessfully tried then no phonemic transcription has been found.

Again, the modification of the retrieved phoneme sequence at step 16 depends on the transformations carried out on the word at step 14. If an infinitive form was found with no mutation, then if an infinitive ending was appended, the phoneme sequence corresponding to the appended infinitive ending is removed from the retrieved phoneme sequence. The phoneme sequence corresponding to the removed verb ending is then retrieved from the verb ending store, and appended to the truncated phoneme sequence. If the word was converted to unmutated form then the phoneme sequence is also modified in an analogous process to that used in step 13. Again, if an apostrophe ending was removed at step 12 then the phonemic transcription corresponding to the removed apostrophe ending is retrieved from the apostrophe ending store 2 and appended to the modified phonemic transcription. The grapheme to phoneme conversion is then complete.

What is claimed is:

1. An apparatus for receiving an input signal representing a word, each word comprising a sequence of one or more graphemes, and for providing a sequence of one or more symbols, each symbol representing a phonetic element of said word, said apparatus comprising
    a first store containing a plurality of representations of words and corresponding symbol sequences;
    a second store containing a plurality of duples, each duple comprising a substitutable grapheme and a corresponding substitute grapheme;
    a third store containing a plurality of duples, each duple comprising a substitutable grapheme and a corresponding symbol; and
    a processor arranged to
        receive said input signal;
        provide a first signal corresponding to a grapheme in the word and a second signal corresponding to any graphemes other than said grapheme;
        access the second store using the first signal to retrieve a corresponding substitute grapheme;
        access the third store using the first signal to retrieve a corresponding symbol;
        provide a modified signal comprising a signal corresponding to said substitute grapheme and said second signal;
        access the first store using the modified signal to retrieve a corresponding sequence of symbols;
        provide a modified sequence of symbols comprising the symbol retrieved from the third store and symbols of the retrieved sequence, which symbols correspond to the second signal.

2. An apparatus as in claim 1 in which the first signal corresponds to the first grapheme in the word.

3. A speech synthesizer incorporating a linguistic analyzer as in claim 1 or claim 2.

4. A speech recognizer incorporating a linguistic analyzer as in claim 1.

5. A method for analyzing a word, each word comprising a sequence of one or more graphemes, and for providing a sequence of one or more symbols, each symbol representing a phonetic element of said word, the method comprising steps of
    a) providing a first signal corresponding to a grapheme in the word and a second signal corresponding to any graphemes other than said grapheme;
    b) using the first signal to determine a corresponding substitute grapheme;
    c) using the first signal to determine a corresponding symbol;
    d) providing a modified signal comprising a signal corresponding to said substitute grapheme and said second signal;
    e) using the modified signal to determine a corresponding sequence of symbols;
    f) providing a modified sequence of symbols comprising the symbol determined at step c) and symbols of the retrieved sequence, which symbols correspond to the second signal.

6. A method as in claim 5 in which the first signal corresponds to the first grapheme in the word.

7. A method according to as in claim 5 in which in the event that no sequence of symbols corresponding to the modified signal is determined at step 3) the method further comprises steps of
    g) providing a suffix signal corresponding to a subsequence of graphemes at the end of the word and a whole stem signal corresponding to the subsequence of graphemes other than those corresponding to the suffix signal;
    h) using the whole stem signal to determine a corresponding sequence of symbols;
    i) in the event that a sequence of symbols corresponding to the stem signal is not determined at step h), providing an ending signal corresponding to a sequence of graphemes with which a word may end and using a signal comprising the whole stem signal and the ending signal to determine a corresponding sequence of symbols;
    j) using the suffix signal to determine a corresponding sequence of symbols; and
    k) providing a sequence of symbols comprising the symbol sequence corresponding to the stem signal and the symbol sequence corresponding to the suffix signal.

8. A method as in claim 7 which in the event that no sequence of symbols corresponding to the stem signal is determined at step h) the method further comprises steps of l) providing a first stem signal corresponding to a grapheme in the sequence of graphemes corresponding to the stem signal and a second stem signal corresponding to any graphemes other than said grapheme;

m) using the first stem signal to determine a corresponding substitute grapheme;

n) using the first stem signal to determine a corresponding symbol;

o) providing a modified signal comprising a signal corresponding to said substitute grapheme and said second stem signal;

p) using the modified signal to determine a corresponding sequence of symbols;

q) providing a modified sequence of symbols comprising the symbol determined at step n), symbols of the retrieved sequence, which symbols correspond to the second stem signal and symbols corresponding to the suffix symbol.

9. An apparatus for receiving an input signal representing a word, each word comprising a sequence of one or more graphemes, and for providing a sequence of one or more symbols, each symbol representing a phonetic element of said word, said apparatus comprising:

a first store containing a plurality of representations of words and corresponding symbol sequences;

a second store containing a plurality of triples, each triple comprising a substitutable grapheme, a corresponding symbol, and a corresponding substitute grapheme, and a processor arranged to receive said input signal, provide a first signal corresponding to a substitutable grapheme in the word and a second signal corresponding to any graphemes other than said grapheme;

access the second store using the first signal to retrieve a corresponding substitute grapheme;

access the second store using the first signal to retrieve a corresponding symbol;

provide a modified signal comprising a signal corresponding to said substitute grapheme and said second signal;

access the first store using the modified signal to retrieve a corresponding sequence of symbols;

provide a modified sequence of symbols comprising the symbol retrieved from the second store and symbols of the retrieved sequence, which symbols correspond to the second signal.

\* \* \* \* \*